United States Patent [19]

Westman

[11] Patent Number: 5,056,269
[45] Date of Patent: Oct. 15, 1991

[54] APPARATUS FOR WORKING IN PIPES

[76] Inventor: Stig Westman, Räfsvägen 22, S-740 40 Heby, Sweden

[21] Appl. No.: 435,462
[22] PCT Filed: Jun. 16, 1988
[86] PCT No.: PCT/SE88/00333
 § 371 Date: Dec. 13, 1989
 § 102(e) Date: Dec. 13, 1989
[87] PCT Pub. No.: WO88/10393
 PCT Pub. Date: Dec. 29, 1988

[30] Foreign Application Priority Data

Jun. 17, 1987 [SE] Sweden .............................. 8702543-3

[51] Int. Cl.⁵ .......................... B24B 5/40; E21B 29/00
[52] U.S. Cl. ..................................... 51/245; 51/241.5;
 15/104.05; 15/104.31; 409/139; 409/143;
 166/55.7
[58] Field of Search .................. 51/245, 241 R, 241 S,
 51/261, 290, 281 P; 166/55.7, 55, 55.6;
 15/104.05, 104.09, 104.11, 104.31–104.33;
 409/139, 140, 143

[56] References Cited

U.S. PATENT DOCUMENTS 4,601,133 7/1986 Gebald et al. ........................ 51/245
4,648,454 3/1987 Yarnell .
4,674,914 6/1987 Wayman et al. .

FOREIGN PATENT DOCUMENTS

183344 9/1955 Fed. Rep. of Germany ........ 51/245
2408953 3/1975 Fed. Rep. of Germany .
155232 11/1986 Norway .
85056851 12/1985 Sweden .
820927 7/1979 U.S.S.R. .
1248311 9/1971 United Kingdom .................. 51/245

Primary Examiner—Roscoe V. Parker
Attorney, Agent, or Firm—Witherspoon & Hargest

[57] ABSTRACT

An apparatus (1) for work inside piping comprising an elongate clamping and/or moving unit (2) with a working attachment (8) at one end. The unit (2) is provided with two arrays of radially projectable feet (6, 7), suitably at either end thereof. The working attachment (8) includes radially projectable elements (22), all of which are adapted for being displaced to the same extent, and one array of feet (6) placed at the end of the unit (2) opposite the working attachment being adapted such that its feet are thrust out to the same extent. The unit (2) suitably comprises two parts (4, 5) which are mutually, reciprocally movable, there being an array of feet (6, 7) arranged in each part (4, 5).

8 Claims, 7 Drawing Sheets

APPARATUS FOR WORKING IN PIPES

The present invention relates to an apparatus for working in pipes. For example, the present invention relates to an apparatus for scouring water and sewage mains and the like. More specifically, the invention relates to an apparatus which while moving through piping can grind off deposits, inwardly projecting roots and connecting pipes, displaced pipe ends and the like, as well as cut up such piping.

In recent years it has become more usual to fit liners or insert pipes in leaking or other wise deficient piping, instead of exchanging the piping. These liners usually consist of relatively short pipe lengths, which are pushed and/or pulled into the existing piping, where they are jointed into complete lengths which form a tight, functioning pipe line.

There may also be occasions when it is desired to pull out or otherwise remove piping, irrespective of whether it is liner piping or other types of piping. For such removal to be possible, it is suitable to cut such piping into shorter lengths which are then easier to remove.

When existing piping is to be provided with liners, there must be no obstacles such as ingrown roots, solidified deposits, inwardly projecting connection pipes and the like, and over the entire length of the piping which is to be provided with liners there must be nothing impeding their insertion. Neither can there by any abrupt curves or displaced pipe joints which give inwardly projecting edges and abrupt angular changes.

In order that the piping including its lining shall have a through flow capacity which is not notably less than that for the original piping, the liners must have a diameter which is as near to that of the original piping as possible, and they must have the least possible wall thickness. This means that the liners will have an outside diameter very close to the inside diameter of the, original piping. It is therefore a requirement that in order for the liners to be inserted in the piping, the latter must be well scoured and prepared with respect to roundness and freedom from obstacles.

An example of such lining technique is described in the Swedish patent application 8505685-1.

The invention will be described hereinafter primarily with respect to sewage piping. However, as already mentioned, it is utilizable in connection with many different types of piping system, as one skilled in the art will understand, and the description is in no way restricting for the invention. Accordingly, the inventive apparatus can be used for scouring piping which has begun to be blocked up by deposits and therefor has deteriorated through flow capacity, for preparing piping, for fitting lines, and for cutting up piping.

The section of a piping system to which liners are to be fitted is first treated conventionally by closing it off and flushing it. After this it is inspected with the aid of TV equipment, and by the ocular inspection thus enabled it can be decided whether it is at all possible to use liners in the section in question. If there are only obstacles such as inwardly projecting connecting pipes and roots, deposits and the like, which is most usual, these can easily be removed with the aid of the inventive apparatus, since it is an easy operation to grind off the edges of displaced pipe joints and, straighten out abrupt curves and the like with this equipment. Particularly inwardly projecting connecting pipes and displaced pipe joints have previously been obstacles which have been so difficult to remove that it has not been possible to use liners.

Of course, different tools for removing obstacles of the kind mentioned have been constructed per se, both of the water jet and rotating type, but no such tool has been found sufficiently usable for being put to work to any large extent. The problem is not only that these tools must cut off or cut away certain obstacles in the piping, but this must also be done with a certain amount of precision. In addition, the operation must take place so that no new edges or abrupt curves occur, which cannot be passed by the liners. The tool should be capable of grinding off or straightening out such pipe parts which give rise to abrupt curves. This requires that the tool be put in a given position and retain this position during the grinding operation.

The apparatus in accordance with the present invention can more nearly be regarded as a precision grinding apparatus, which, when it has passed through a length of pipe, also guarantees that the pipe has sufficient size and the correct shape for allowing liners to be fitted to it without any problems.

The present invention thus aims at removing the above mentioned problems. This aim is achieved by apparatus of the kind disclosed in the claims, in which the distinguishing features characterizing the invention have been disclosed.

The invention will now be described in more detail hereinafter in connection with the accompanying drawings, where FIG. 6 is a section along the line VI—VI in FIG. 4b, FIGS. 7a, 7b and 7c are schematic views illustrating the operation sequence for grinding off an inwardly projecting connection pipe.

Figure 1:
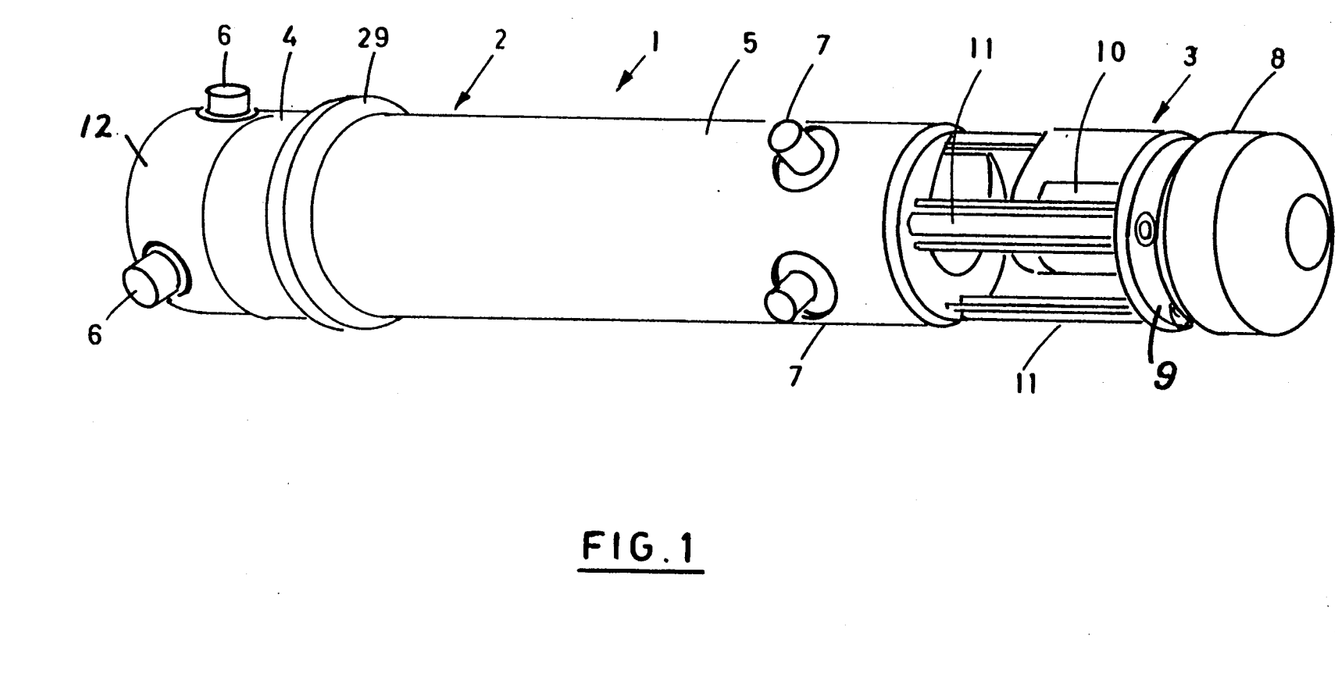
FIG. 1 is a schematic perspective view of grinding apparatus in accordance with the invention.

An embodiment of the grinding apparatus 1 in accordance with the invention is illustrated in FIG. 1. The apparatus has a generally cylindrical shape with a substantially circular cross section, and includes a moving unit 2 and a working or grinding unit 3. The moving unit 2 is of the telescoping type with two axially, mutually relatively movable parts, a rear or end part 4 and a forward part 5, which carry the working unit 3. The parts 4 and 5 are respectively equipped with an array of radially projectable feet 6 and 7, which can be caused to engage against the inner wall of the pipe surrounding the apparatus 1, for keeping both parts 4, 5 in desired positions in the pipe. By providing parts 4, 5 alternately clamping against the inside of the pipe as the moving unit 2 is extended and contracted, the apparatus 1 is moved in the pipe in a conventional manner.

In the embodiment according to FIGS. 1–7, the working unit 3 includes a head 8, rotatably carried by a holder 9 for rotation with the aid of a motor 10 fixed to the holder 9. The grinding head 8 includes an array of grinding elements which are radially adjustable for suiting different pipe dimensions. The working unit 3 is carried axially displaceably by bars 11, which are in turn carried in guides in the forward part 5 of the moving unit 2. The working unit 3 is shown extended in FIG. 1.

Figure 2:
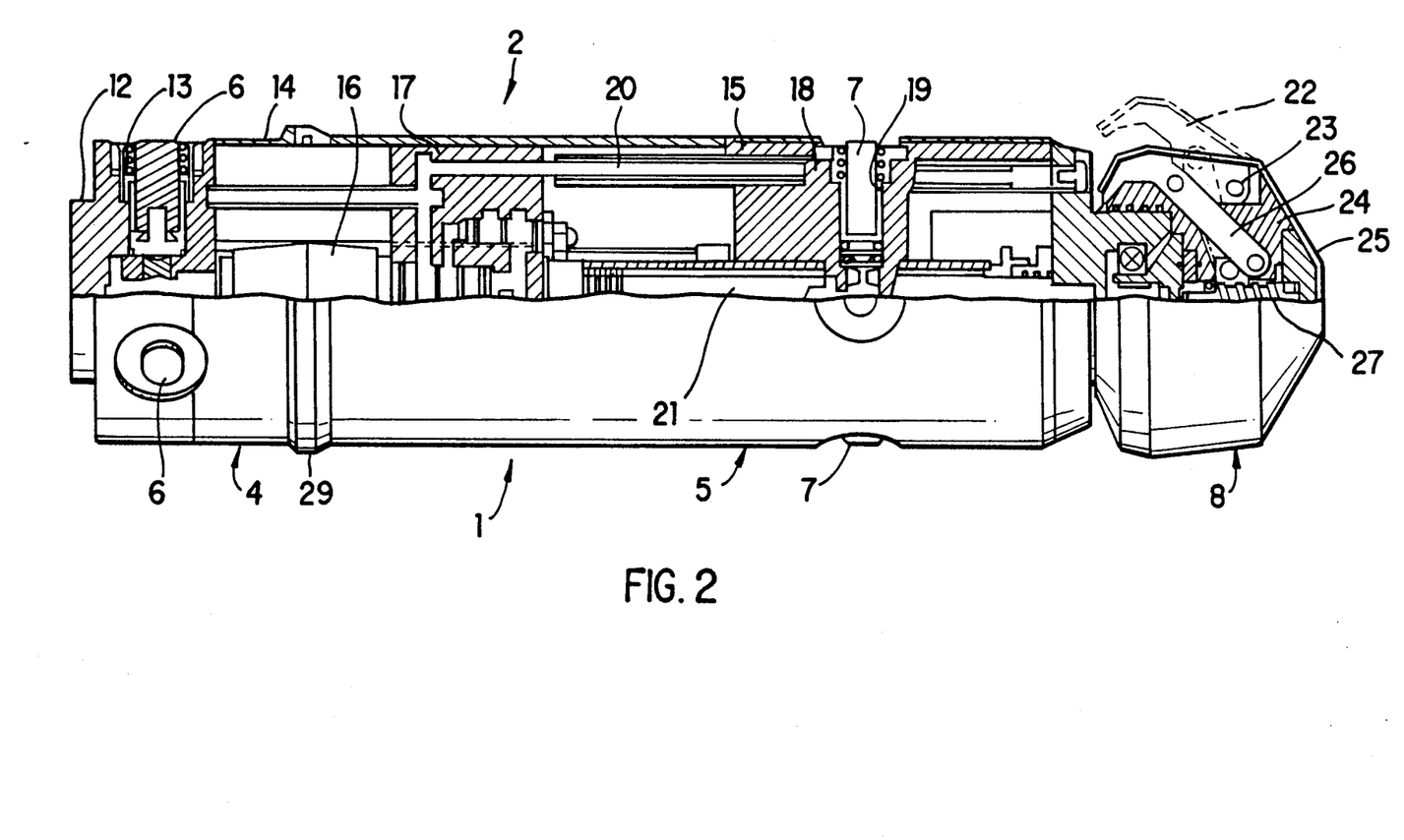
FIG. 2 is a partially sectioned side view of the apparatus in FIG. 1, FIGS. 3a, 3b and 3c are schematic views illustrating the sequence of operations in grinding off an inwardly projecting edge on a broken pipe.

In FIG. 2 the apparatus 1 with the moving unit 2 and working unit 3 is shown from one side and partially sectioned, so that details in its interior are visible to a certain extent. The rear part 4 includes a disk-shaped end block 12 in which the radially projectable feet 6 are arranged in the form of pistons placed in radially directed bores 13. The axially outwardly facing surface of the block 12 is provided with unillustrated connections to electrical and/or hydraulic lines for operating and driving the apparatus 1.

A tubular protective casing 14 extends from the block 12 and under a similar casing 15, which extends from the forward part 5 backwards towards the block 12. Inside the rear casing 14 there is apart from cables and piping, an array of solenoid valves 16 and a distributor block 17, with the aid of which the different working functions of the apparatus 1 are controlled.

Apart from the protective casing 15, the forward part 5 of the moving unit 2 includes a disk-shaped forward block 18 with an array of projectable feet 7 in the form of pistons arranged in radial bores 19. There are telescopically extendable pipe means between the distributor block 17 and the block 18 for transmitting hydraulic liquid from the distributor block 17 to different members, one such pipe means 20 being illustrated in FIG. 2.

The feet or pistons 6 in the block 12 are controlled such that they all project out equally as much when they are pressurized. The feet or pistons 7 in the block 18 are free to project out to different lengths.

The two parts 4 and 5 forming the moving unit 2 are, as mentioned, mutually relatively displaceable. By thrusting out the feet 6 into locking engagement against the surrounding pipe wall, extending the moving unit 2, thrusting out the feet 7 into locking engagement against the surrounding pipe wall, retracting the feet 6 and contracting the moving unit 2, the entire apparatus 1 will have been moved a distance. By repetitions of the described cycle, the apparatus 1 can move stepwise through a pipe. In the embodiment in question, the extension and contraction of the moving unit 2 is carried out with the aid of centrally placed piston-cylinder unit 21, which is implemented such that it cannot rotate about its longitudinal axis. No particular guides are thus required to prevent rotational movement, which must not occur, particularly with regard to the telescopable pipe means.

The illustrated grinding head 8 includes an array of grinding elements 22, which on their outside are provided with grinding material such as silicon carbide, diamonds or the like. These grinding elements 22 have an outward substantially convex shape in cross section, which is the longitudinal direction of the apparatus 1, and an arcuate shape in their length section, which is transverse the apparatus, for adapting to the shape of the surrounding pipe. Seen in a longitudinal cross section of the apparatus, each grinding element is pivotably mounted at its forward end by a pin 23 to the body 24 of the grinding head 8. As with the forward end of the grinding element 22 the shaft 23 is protected behind a shield 25 covering the forward central portion of the body 24. The shield 25 is also suitably coated with grinding material, such as is used with the grinding elements 22. A link 26 is pivotably mounted on each element 22 rearwards of the pin 23. The other end of the link 26 is pivotably mounted to the nut of a nut and screw mechanism 27 disposed about the central axis of the grinding head 8. By rotating the screw the grinding elements 22 can be pivoted about their pins 23 for moving them radially inwards or outwards. All the elements 22 on the grinding head 8 are implemented alike, and connected to the same screw mechanism. This means that all the elements are swung outwards or inwards to the same radial position. The mechanism can be implemented or controlled such that the elements can be set into previously predetermined positions for certain pipe diameters.

Figure 3A:
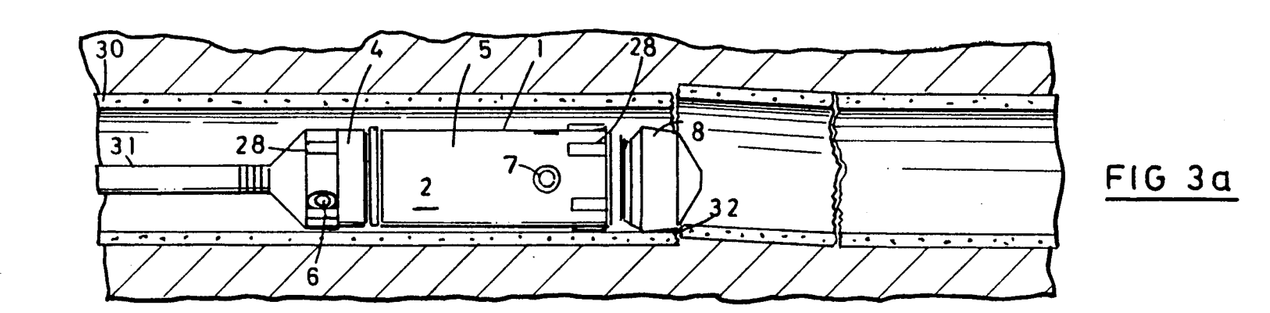
Figure 3B:
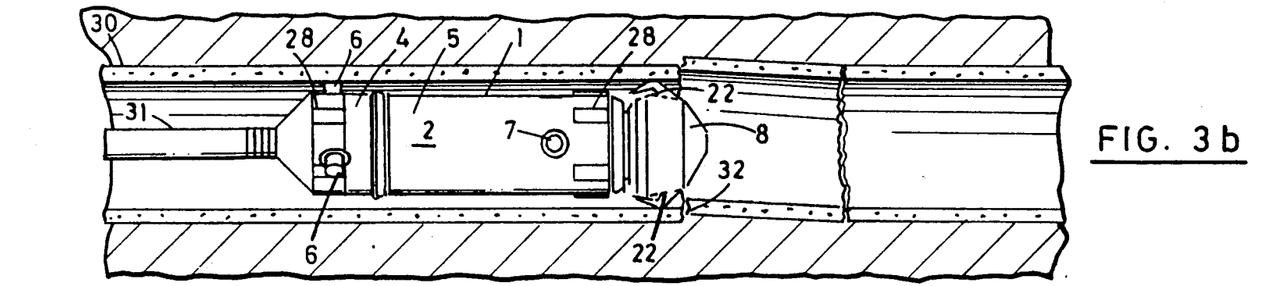
Figure 3C:
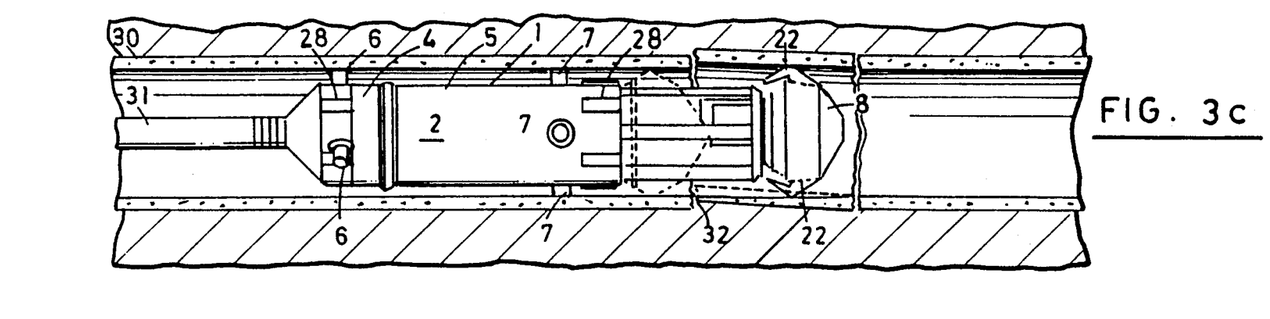

To protect the apparatus 1 from unnecessary wear when it is moved through piping, it is suitable to provide it with wear blocks 28 in the vicinity of the blocks 12 and 18, as depicted, for example, in FIGS. 3a–c. Alternatively, the apparatus 1 can be provided with wheels or rollers for reducing wear. A sealing ring 29 is arranged at the rear end of the casing 15 between it and the casing 14.

From FIGS. 3a–c will be seen an operation sequence where the apparatus is used for grinding away a pipe edge, caused by the pipe having moved in the ground. This type of trouble is not unusual and has previously been an obstacle with respect to lining a pipe, particularly where the liner has had a comparatively large diameter. With the aid of the inventive grinding apparatus it is quite easy, however, to grind off the edges and give the pipe its original diameter at the site of such damage.

The operation is carried out in the following manner: After the pipe in question has been treated conventionally, i.e. flushed, examined using TV equipment and the position of damage which is to be remedied decided, the grinding apparatus 1 is taken into the pipe, e.g. from an inspection chamber or the like. A hose 31 is suitably used for moving the apparatus 1 up to the damage which is to be remedied. The hose can be a conventional fire hose which is pressurized with the aid of compressed air to make it sufficiently stiff for pushing the apparatus 1 along the pipe 30. The lines and cables, which are required for the supply of compressed air, electricity and the like for driving and operating the apparatus, are taken through the hose 31, from the equipment above ground and up to the apparatus 1 itself, to give them good protection against wear and other damage.

When the apparatus 1 has arrived at the site of damage, its starting position is determined with the aid of the TV equipment. It is essential that the grinding is performed so that there is no bend or other abrupt curvature in the pipe preventing a liner to pass, and grinding is performed so that the damaged place will be in line with the pipe on both sides thereof as far as possible.

When the grinding head 8 has reached the position illustrated in FIG. 3a, with the parts 4 and 5 close together and the grinding head retracted, the grinding elements 22 are extended into contact with the pipe, whereby the forward end of the apparatus is centered in the pipe 30. The rear feet 6 are subsequently or simultaneously thrust out, the situation so far being illustrated in FIG. 3b. It is important here that the grinding elements 22 and feet 6 bear against an undamaged part of the pipe 30, so that grinding will take place in a directed path coinciding with the main direction of the pipe 30. The forward feet 7 are now thrust out to lock the moving unit 2 in position. Since the grinding elements 22 are thrust out to the inside diameter of the pipe, grinding can now begin, although it is suitable for the elements to be retracted somewhat before starting grinding. The grinding head 8 is rotated and moved forwards, supported by its guide bars 11, enabling it to grind off the inwardly projecting edge 32, while the broken-off pipe is calibrated at the same time.

If the damage is such that the maximum axial stroke given to the grinding head 8 is too short for the damage to be regarded as completely remedied, the rotation of the head is stopped with the elements in their extended position. The forward feet 7 are then retracted and the forward part 5 of the moving unit 2 is thrust forward, the grinding head maintaining its position, i.e. head 8 and part 5 approaches head 8. When the parts 4 and 5 of the unit 2 have thus been thrust apart to a maximum, the feet 7 are once again thrust out, the feet 6 retracted, parts 4 and 5 drawn together and the feet 6 once again extended, the unit 2 now being stabilized so that the grinding operation can continue. This procedure for moving and grinding can be repeated, in principle, for any length of pipe, giving the whole time a fixed direction to the grinding action, so that liners can easily be inserted in the pipe 30.

Figure 4A:
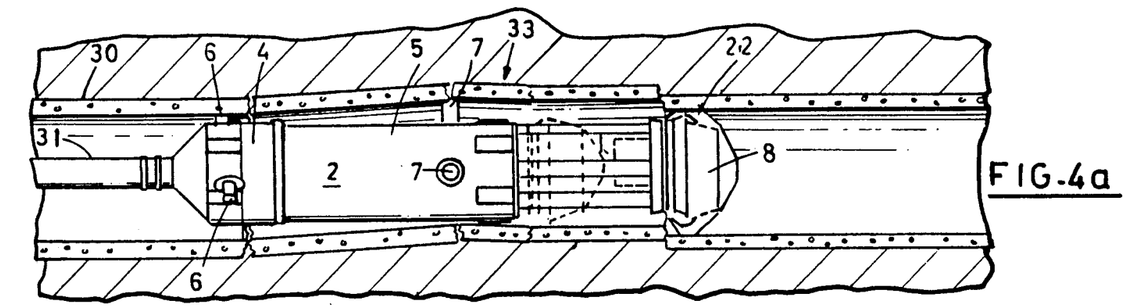
FIGS. 4a and 4b are schematic views illustrating an alternative operation sequence for scouring a broken pipe.
Figure 4B:
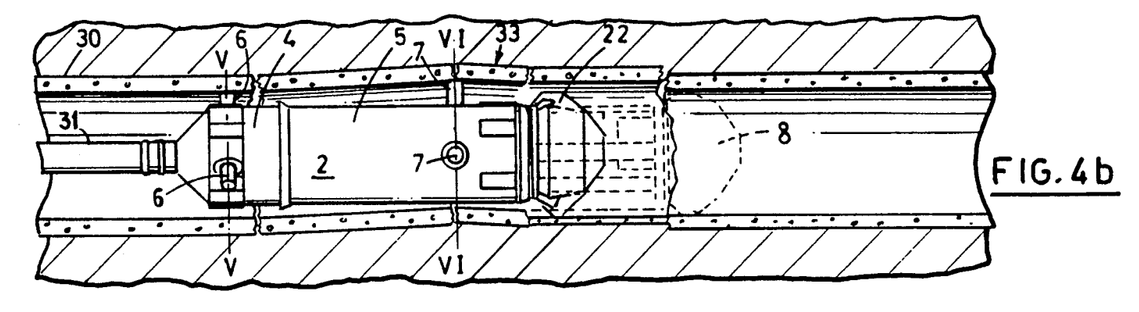
Figure 5:
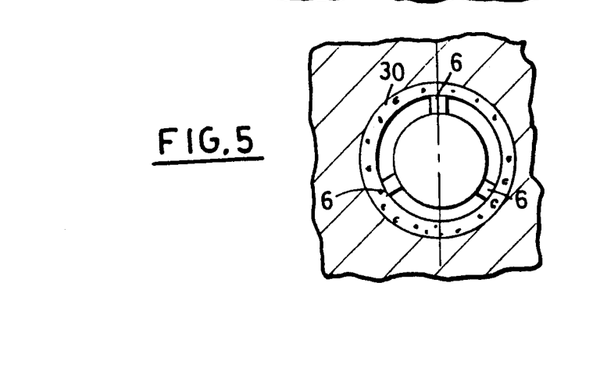
FIG. 5 is a section along the line V—V in FIG. 4b.
Figure 6:
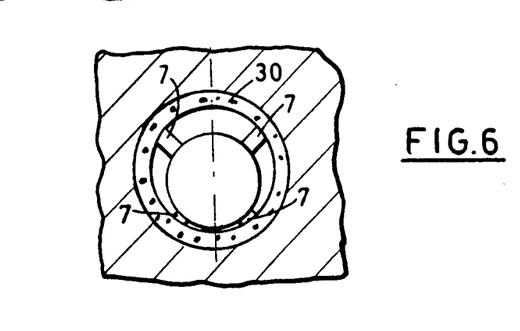

FIGS. 4a and 4b illustrate an alternative operational sequence for the apparatus 1 when it is used for grinding a longer damaged portion 33 of the pipe 30. In this case as well, the pipe 30 has been prepared conventionally, with the position and complicity of the damage having been determined with the aid of TV equipment. Although the damage here is over a longer distance, it is still within the bridging ability of the apparatus 1, with the parts 4 and 5 as far apart as possible and with the grinding head as far away from the part 5 as possible, although grinding must take place in steps in a similar manner to what has already been described.

Accordingly, as will be seen from FIG. 4a, the apparatus 1 has been aligned by thrusting out the grinding elements 22 and the rear feet 6 into engagement against the undamaged inside wall of the pipe 30, thus aligning the grinding apparatus 1 itself, after which the forward feet 7 are thrust out. The positions of the feet 6 and 7 will be clearly seen from the respective FIGS. 5 and 6. Grinding can now commence, and in this case the grinding head is pulled back towards the part 5 until it is completely retracted, as illustrated by full lines in FIG. 4b. Rotation of the grinding head is now stopped, and with the grinding elements 22 and the feet 7 bearing against the surrounding pipe wall for maintaining alignment of the apparatus, the feet 6 are retracted and the part 4 is thrust backwards as far as possible. The feet 6 are once again thrust out, a small alteration of the position of the grinding apparatus 1 being enabled in response to the extension of the pipe 30. The feet 7 are then retracted and the part 5 moved towards the part 4 so that the moving unit 2 is suitably completely contracted, the grinding head 8 remaining the whole time in the position where grinding has temporarily been stopped. As soon as the feet 7 are thrust out, the grinding apparatus 1 has substantially the same direction and centering as illustrated in FIG. 4a. A renewed grinding operation can then be started and moving and grinding can be repeated for as long a distance as is required for the damage to be removed so that insertion of liners can take place unhindered. During this grinding while "backing", all abrupt bends and edges are ground off so that the pipe has only long, gentle curves, if there are any curves at all, and these do not hinder in any way the insertion of liners. By grinding a distance during extension as well as retraction of the grinding head 8 with intermediate alteration of the direction of the moving unit 2, all obstacles to the passage of liners are definitely removed.

Figure 7A:
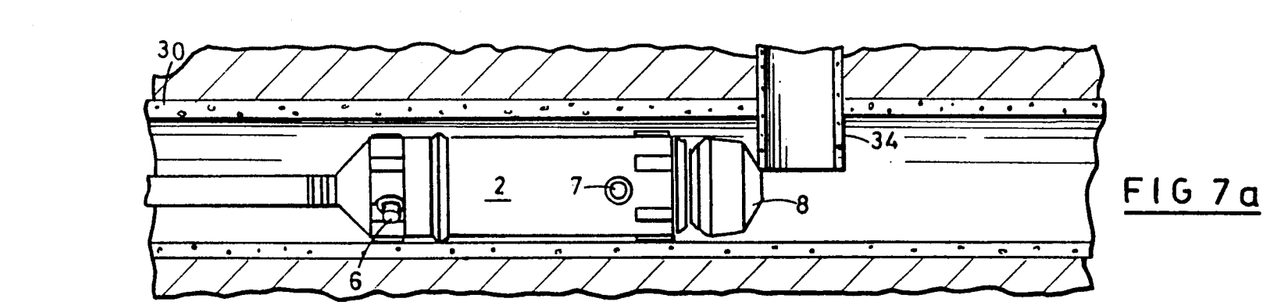
Figure 7B:
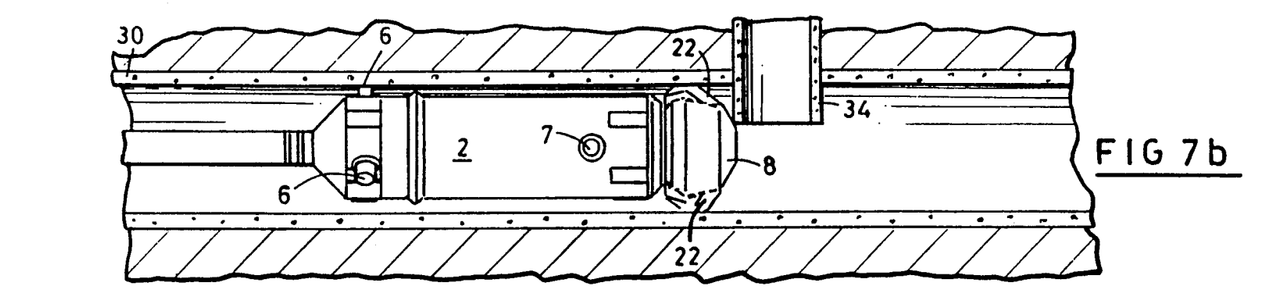
Figure 7C:
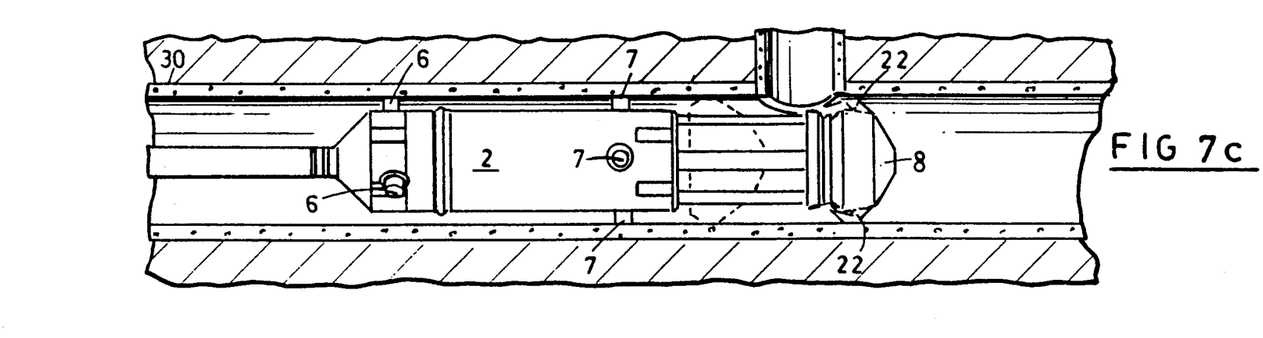

The FIGS. 7a-c illustrate an operation sequence for grinding away a connecting pipe 34 projecting into the pipe 30. After the usual preparation of the pipe 30, and determination of the position of the connecting pipe 34, the grinding apparatus 1 is inserted into the pipe 30 in accordance with what has already been described in connection with FIGS. 3a-c. When the grinding head 8 is immediately adjacent the projecting connection pipe 34, the grinding elements 22 and feet 6 are thrust out, so that the grinding apparatus is centered and lined up in the pipe 30, after which the feet 7 are thrust out. The grinding head 8 is rotated and moved forward for grinding off the projecting part of the connecting pipe 34. If the maximum stroke of the grinding head 8 is not sufficient for completely grinding away the projecting part of the pipe 34, the same working operation as previously described can be utilized.

Figure 8:
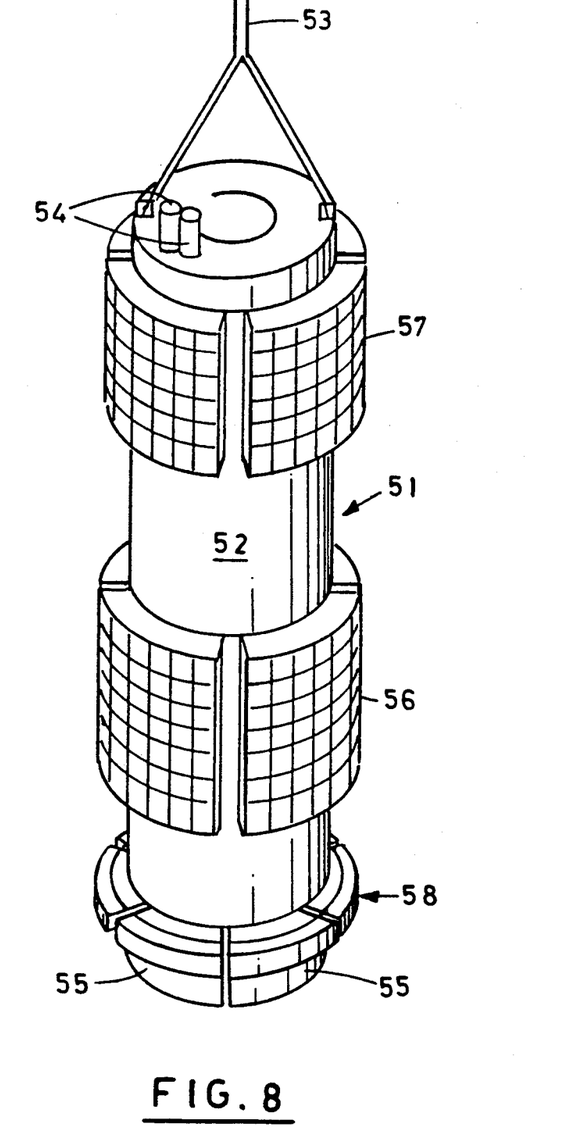
FIG. 8 is a schematic perspective view of another embodiment of the inventive apparatus.
Figure 9A:
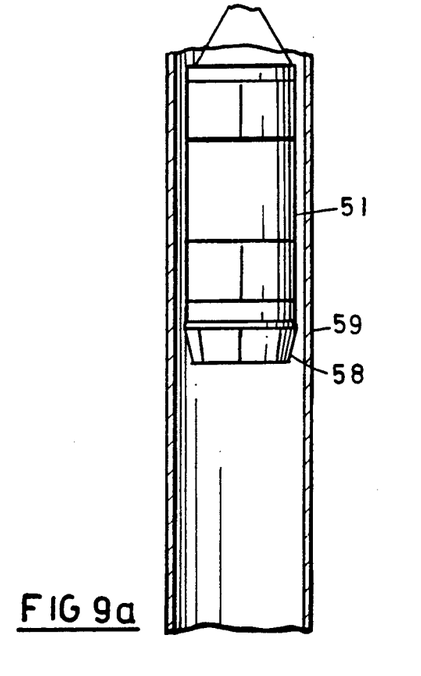
FIGS. 9a–d are schematic views illustrating the operation sequence in cutting a pipe with the aid of the apparatus in FIG. 8.
Figure 9B:
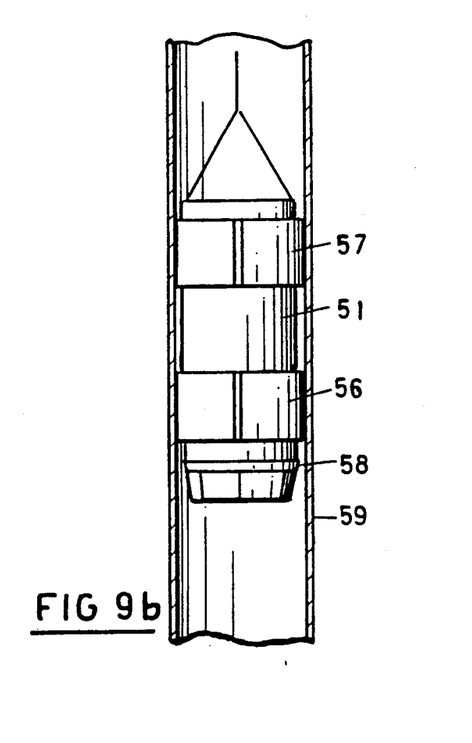
Figure 9C:
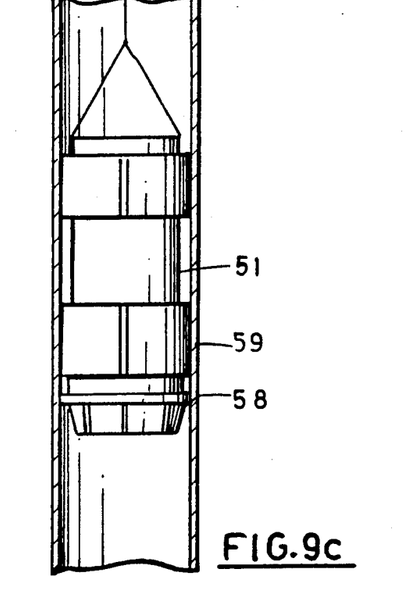
Figure 9D:
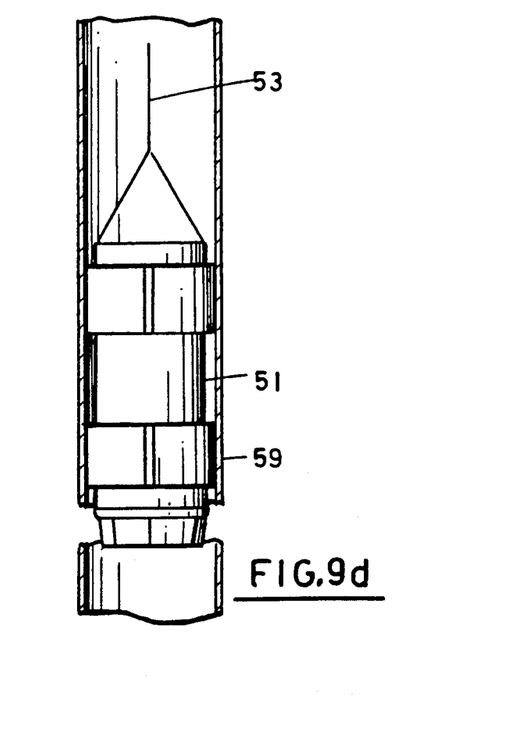

Another embodiment of the apparatus in accordance with the invention is illustrated in FIG. 8. This apparatus 51 is intended for cutting off pipes, and includes a clamping unit 52, which also can constitute a moving unit, as with the previously described embodiment. The unit 52 has two arrays of feet 6, 7, which can be urged radially outwards into engagement against the inner wall of the surrounding pipe. At one end of the unit 52 there are means 53 for inserting the apparatus 51 into a pipe, as well as connections 54 for lines supplying power, e.g. electricity and compressed air, to operating and driving means. At the other end of the unit 52 there is an array of cutting elements 55 forming together a rotatable cutting disk 58. The feet 6, 7 have considerable extension in the axial direction of the apparatus and are curved so that at least a greater part of their periphery can engage against the surrounding pipe wall. The large superficial extension gives a large engagement force against the inside of the pipe with comparatively low surface pressure, thus making the risk of damage to the surrounding pipe comparatively small.

From FIGS. 9a-d will be seen a working sequence for cutting and withdrawing a pipe section using the apparatus 51 according to FIG. 8. In the illustrated case, a vertically arranged pipe 59 is shown which preferably is a pipe for taking up water from a well or the like. The apparatus 51 is lowered to desired depth in the pipe 59, the site of the end visaged cut being determined beforehand with the aid of TV equipment and/or measurement. In this position the feet 56, 57 are thrust out into stable engagement against the inner wall of the surrounding pipe 59. The apparatus 51 is then automatically aligned in the same way as the previously described apparatus 1. The cutting disk 58 is then caused to rotate simultaneously as it is caused to expand, resulting in cuts through the wall of the pipe 59. By allowing the feet 56, 57 to remain clamped against the pipe wall, the cutoff pipe length will accompany the apparatus 51 when the latter is raised.

One skilled in the art will understand that the apparatus 51 can be used for cutting pipes, irrespective of their length.

A hydraulic system is suitably used for driving the apparatus 1, 51 in accordance with the invention, irrespective of whether the apparatus is implemented for grinding or cutting, or a combination thereof. Alternatively, driving can be powered by electricity or compressed air, or a combination of these, the power source and operating equipment being placed above ground. The equipment for operation is constructed such that each working operation can be controlled independently, or a series of such operations can take place in sequence automatically. The latter is particularly applicable with regard to moving the apparatus inside a pipe. Here the sequence of operations, as already mentioned, is that the feet 6, 56 are thrust out into stable engagement against the inner wall of the surrounding pipe 30, 59, the forward part 5 of the moving unit 2, 52 is thrust away from its rear part 4, the feet 7, 57 are thrust out into stable engagement against the pipe wall, the feet 6, 56 are retracted and the rear part 4 of the moving unit 2, 52 is moved towards the forward part. The cycle is repeated to the extent desired for moving the apparatus 1, 51.

The automatic movement mentioned above is not so rapid, however, which has importance particularly when the distance to be moved through the piping is long. It is considerably quicker to push or pull the apparatus through the piping, as far as possible. Since the rotating grinding head 8 or the cutting disk 58 is in the forward part, it is difficult to provide any attachment for a pulling line there. It is therefore more simple to push the apparatus 1, 51 in the pipeline. A simple way of achieving this has been mentioned previously, and this includes a woven hose 38 of the fire hose type, one end of which is attached to the end of the apparatus 1, 51 opposite to the grinding head 8, 58, and the other end being attached to a compressed air source. In an unused state, this hose can be rolled up, thus taking up small space, although when it is pressurized, it will straighten out and be sufficiently stiff to enable it to be used as a pushing means, while at the same time it can be made to curve. Such a hose also has the advantage that it forms wear protection, in the way mentioned previously, for the lines which are used for supplying power for driving and controlling the working operations, between the apparatus 1, 51 and driving and operating equipment on the ground.

Although the apparatus in accordance with this invention has been primarily invented for solving the problem of grinding and cutting inside piping, one skilled in the art in this field will understand that it can very well be used for other purposes, depending on what working attachment the moving unit is equipped with. Such embodiments are intended to lie within the scope of the accompanying claims.

I claim:

1. Apparatus (1, 51) for work inside piping (30, 59) and comprising an elongate clamping and/or moving unit (2, 52) with a working attachment (8, 58) at one end, characterized in that the clamping and/or moving unit (2, 52) includes two arrays of radially projectable feet (6, 7; 56, 57) one array at either end of the unit, in that the working attachment (8, 58) includes radially projectable elements (22, 55) all of which are adapted for being displaced to the same extent, and in that the array of feet (6, 56) at the end of the clamping and/or moving unit facing away from the working attachment (8, 58) is adapted such that the feet are all displaced to the same extent.

2. Apparatus as claimed in claim 1, characterized in that the clamping and/or moving unit (2, 52) comprises two parts (4, 5) which are mutually, reciprocally movable, an array of feet (6, 7; 56, 57) being arranged on either part (4, 5).

3. Apparatus as claimed in claim 1, characterized in that the working attachment (8, 58) is displaceable reciprocally in relation to the clamping and/or moving unit (2, 52).

4. Apparatus as claimed in claim 2, characterized in that a driving medium of the apparatus (1, 51) is transmitted between its parts (4, 5) by telescopically extendable and retractable pipes (20).

5. Apparatus (1, 51) for work inside piping (30, 59) and comprising on one hand an elongate clamping and/or moving unit (2, 52) comprising two parts (4, 5) which are axially mutually reciprocally movable and each including a set of radially projectable and retractable feet (6, 7, 56, 57), and a working attachment (8, 58) at one end of the clamping and/or moving unit (2, 52), which attachment (8, 58) includes radially projectable and retractable working elements (22, 55), the set of feet (6, 56) on the part (4) of the clamping and/or moving unit (2, 52) which is opposite to the one at which the working attachment (8, 58) is secured, being so arranged that the feet (6, 56) are displaced to the same extent and the working elements (22, 55) as well being arranged to be displaced to the same extent, characterized by the fact that the working attachment (8, 58) is axially movable towards and away from the clamping and/or moving unit (2, 52), the working attachment (8, 58) as well as the mutually axially movable parts (4, 5) being rectilinearly movable in relation to each other, and by the fact that the working attachment (8, 58) is arranged to work in both its directions of movement.

6. Apparatus as claimed in claim 2, characterized in that the working attachment (8, 58) is displaceable reciprocally in relation to the clamping and/or moving unit (2, 52).

7. Apparatus as claimed in claim 3, characterized in that a driving medium of the apparatus (1, 51) is transmitted between its parts (4, 5) by telescopically extendable and retractable pipes (20).

8. Apparatus as claimed in claim 6, characterized in that a driving medium of the apparatus (1, 51) is transmitted between its parts (4, 5) by telescopically extendable and retractable pipes (20).

* * * * *